July 28, 1970  T. M. SMITH  3,521,895
TOOL HOLDER
Filed July 24, 1968
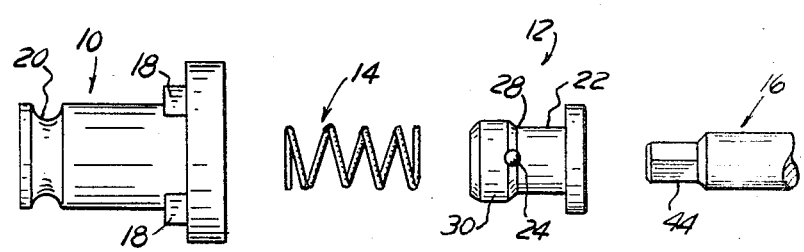
FIG. 1
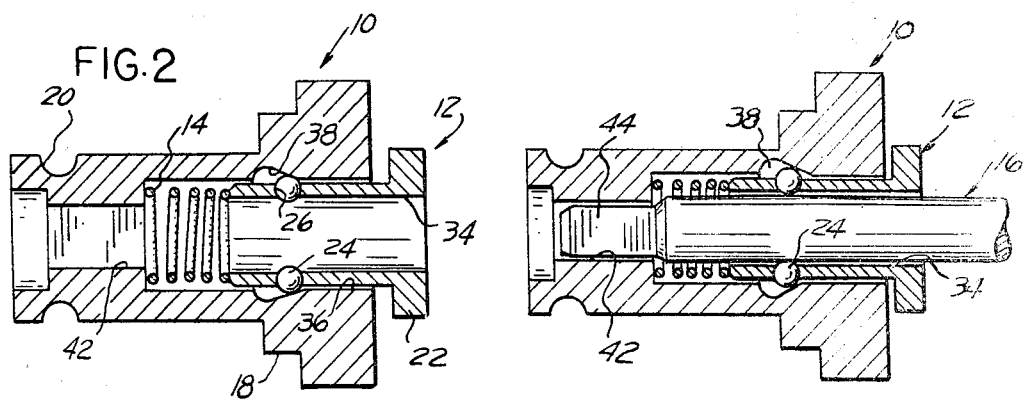
FIG. 2
FIG. 3
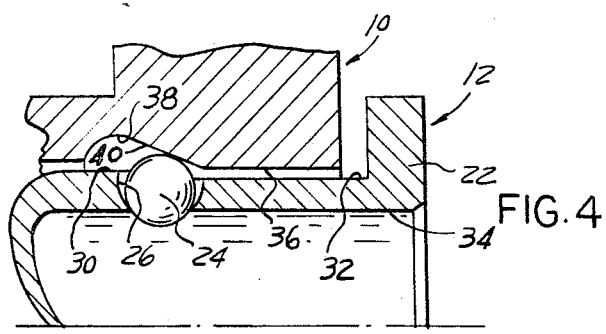
FIG. 4
INVENTOR
THEODORE M. SMITH
BY Cullen, Sloman, & Cantor
ATTORNEYS United States Patent Office 3,521,895
Patented July 28, 1970

3,521,895
TOOL HOLDER
Theodore M. Smith, 14750 Puritan Ave.,
Detroit, Mich. 48227
Filed July 24, 1968, Ser. No. 747,155
Int. Cl. B23b *31/22*
U.S. Cl. 279—22    1 Claim

ABSTRACT OF THE DISCLOSURE

A tool holder which comprises an adapter and an axially slidable internal bushing which in turn receives and grips a tool to be driven. The tool is held within the bushing by a series of locking balls which are selectively cammed inwardly into the bushing bore by a tapered groove in the bore of the adapter. The tool is released by sliding the bushing against the compression of a spring to a point where the locking balls can move radially outwardly. The bushing is held within the adapter by an interference fit.

---

This invention rleates to improved releasable tool retaining means for holding types of tools.

BACKGROUND OF INVENTION

In the past, tool holders have been utilized for retaining and driving certain types of tools. These holders generally have a non-circular shaped bore at their inner end, to impart rotary movement to the similarly shaped inner end of the tool to be driven. To clamp the tool within the holder, an axially slidable bushing has been employed, these bushings generally being provided with a locking device for normally preventing the tool from being withdrawn from the bushing and adapter.

However, problems have arisen with these prior art designs in that the compression spring generally forming a part of this assembly tends to eject the bushing from the adapter. Prior art means for retaining the bushing within the adapter have not been entirely satisfactory.

Hence, it is an object of this invention to provide an improved locking device for retaining such bushings as well as the tool itself within a tool holder.

BRIEF DESCRIPTION OF THE DRAWINGS

FIG. 1 is an exploded view of the components of the tool holder of this invention, fragmentarily showing in addition the inner end of a tool to be driven.

FIG. 2 is a cross-sectional elevation of the tool holder of this invention, shown in its normal condition without a tool inserted therein.

FIG. 3 is a cross-sectional elevation similar to FIG. 2, but showing a tool retained within the holder.

FIG. 4 is an enlarged fragmentary cross-sectional view of the retaining portion of the assembly shown in FIG. 2.

DETAILED DESCRIPTION OF THE INVENTION

Referring to FIGS. 1 through 3 of the drawings, the invention generally comprises chuck adapter 10, bushing 12 and compression spring 14. This assembly in turn releasably retains a tool fragmentarily shown at 16, which tool may be a tap or the like.

The exterior of chuck adapter 10 is provided with a pair of driving lugs 18 which are engaged and rotatably driven by the power source. Adapter 10 is further provided with locking groove 20 which receives a locking ring or set screw or the like to hold the assembly within the power tool.

Bushing 12 is provided at its outer or right hand end with flange 22 which limits the inward travel of the bushing into adapter 10. However, the length of the bushing and the spring does the same thing, thus; the flange is not entirely necessary. The bushing has a series of small locking balls 24 located in holes 26 spaced around the circumference of the bushing along a common circle. Balls 24 are somewhat greater in diameter than the wall thickness of the bushing, for a purpose to be described below. The diameter of each of holes 26 at their inner ends is slightly less than that of the balls, so as to form a seat which prevents the balls from falling inward into the bore of the bushing.

Located substantially at the circle of balls 24 is a shoulder 28 on the periphery of the bushing surface, best shown in FIG. 1. This shoulder interconnects a large diameter portion 30 with a small diameter portion 32 of the bushing surface. A central longitudinal circular bore 34 receives tool 16.

The outer or right hand portion of adapter 10 is provided with a circular bore 36 having a rounded unlocking ball groove 38 approximately midway along its length. As best shown in FIG. 4, a conical groove 40 interconnects unlocking ball groove 38 with the outer portion of bore 36, this conical groove converging toward the outer or right hand end of the bore. It will further be seen from FIG. 4 that the diameter of bore 36 is slightly less to the right of the tapered groove 40 than it is to the left of unlocking ball groove 38.

Referring back to FIGS. 2 and 3, the inner end 42 of the adapter bore has a square cross-section to receive the square shank 44 of tool 16.

OPERATION

Since the inner diameter of the opening of bore 36 in adapter 10 is smaller than the outer diameter 30 of the inner end of bushing 12, the resulting interference fit requires some degree of force to make this initial assembly. This snap fit may be accomplished with a light rap to drive the bushing into the adapter bore. Once assembled, the interference caused by the relationship of these diameters is sufficient to prevent the bushing from being forced out by spring 14.

From FIG. 2 and FIG. 4, it will be seen that it is impossible to insert tool 16 into bore 34 of bushing 12 without pressing bushing 12 inward or to the left against the compression of spring 14. This is the case because the gap between locking balls 24 in the position of FIG. 2 is insufficient to permit entry of tool 16. However, when the bushing is pressed in slightly, balls 24 are brought into register with unlocking ball groove 38 in the bore of adapter 10, where there is space available for them to be cammed outwardly by tool 16.

Once the tool is in place, bushing 12 is released, and the compression of spring 14 again biases bushing 12 outwardly to the right. This movement causes balls 24 to ride along the converging ramp of tapered groove 40, which cams the balls inwardly to tightly grip tool 16. It is this compression of spring 14, coupled with the inward biasing of balls 24 from tapered groove 40 that holds tool 16 from falling out of bushing 12. Removal of the tool is accomplished by simply pressing inward on bushing 12 to bring balls 24 into alignment with groove 38, and pulling out the tool.

The snap fit of bushing 12 in adapter 10 provides a superior means for preventing ejection of the bushing by spring 14. The machining operations required are simple and minimal. There are no supplementary components such as set screws to become misplaced or worn or broken.

This invention may be further developed within the scope of the following claim. Accordingly, the above specification is to be interpreted as illustrative of only a single operative embodiment of this invention, rather than in a strictly limited sense.

I now claim:

1. In a chuck of the class described which includes a body having a bore; a tool receiving bushing in said bore; and a compression spring for outwardly biasing the bushing;

said body having a ball groove between its ends and also having its bore diameter greater on the inner side of said groove than on the outer of said groove;

said bushing having a line of tool locking balls between its ends in line with said groove; and having its diameter greater on the inner side of said balls than on the outer side of said balls;

with the larger diameter part of the bushing being of less diameter than and clear of the larger diameter part of the bore; and with the smaller diameter part of the bushing being of less diameter than and clear of the smaller diameter part of the bore; and with the larger diameter part of the bushing being slightly greater in diameter than the smaller diameter part of the bore;

whereby insertion of the bushing fully into the bore requires a hammer tap on the bushing; and whereby the locking balls of the bushing engage the shoulder separating the smaller diameter part of the bore from the larger diameter part of the bore and thus prevent the bushing from being biased out of the bore by the spring;

with radial clearance between all parts of the bushing and bore.

References Cited

UNITED STATES PATENTS 3,039,781    6/1962    Bilz _____ 279—75

ROBERT C. RIORDON, Primary Examiner

D. D. EVENSON, Assistant Examiner

U.S. Cl. X.R.

279—75